Feb. 23, 1926.
R. A. FESSENDEN
1,574,074
CHANNEL PILOT
Filed March 21, 1921
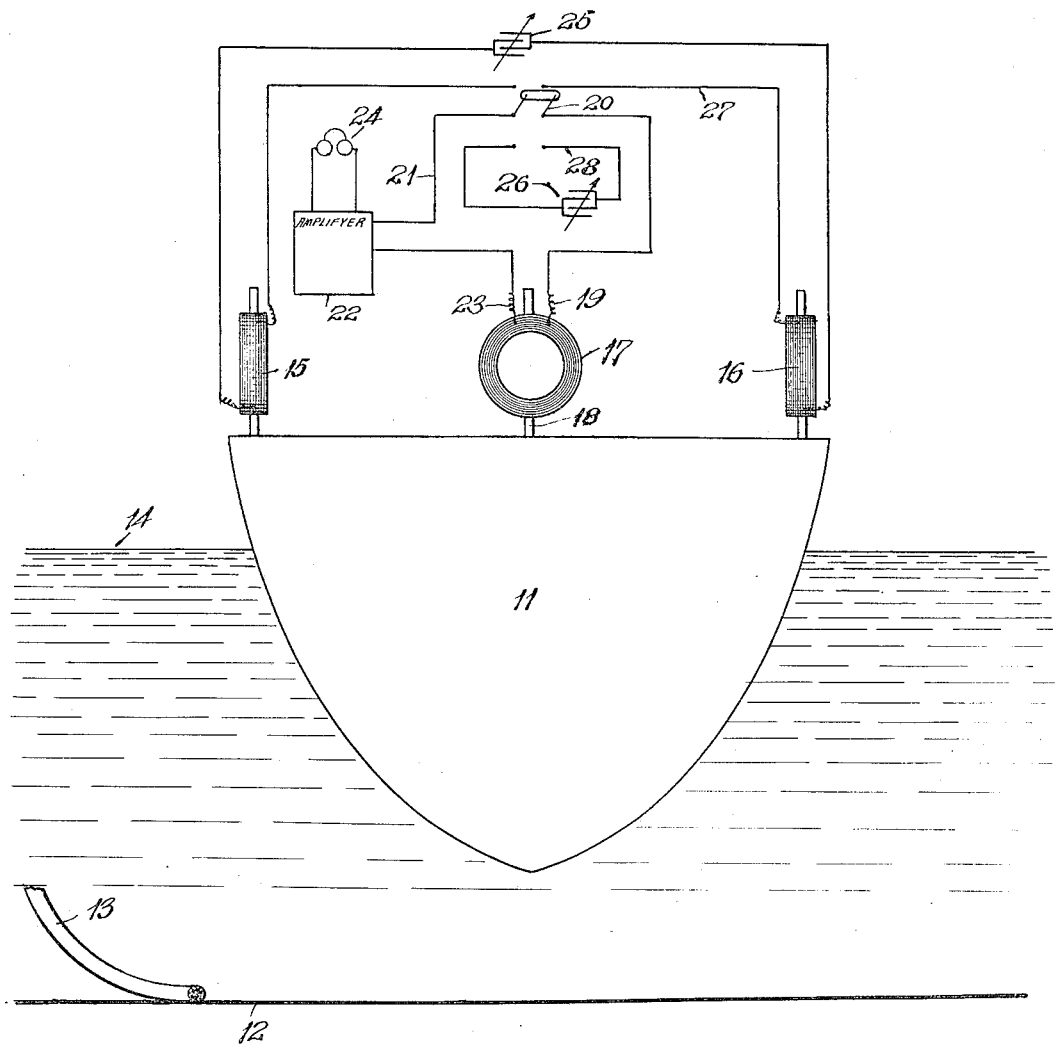
WITNESS:
Reginald A. Fessenden.
INVENTOR.

Patented Feb. 23, 1926.

1,574,074

UNITED STATES PATENT OFFICE.

REGINALD A. FESSENDEN, OF CHESTNUT HILL, MASSACHUSETTS.

CHANNEL PILOT.

Application filed March 21, 1921. Serial No. 454,057.

*To all whom it may concern:*

Be it known that I, REGINALD A. FESSENDEN, of Chestnut Hill, in the county of Middlesex and State of Massachusetts, a citizen of the United States, have invented certain new and useful Improvements in Channel Pilots, of which the following is a specification.

My invention relates to methods and apparatus for determining the location of moving objects and more particularly for piloting ships through channels in fog.

My invention has for its object increased efficiency and accuracy in such determination, and more particularly for determining on which side of the moving object a source of impulses is located.

The figure shows, partly diagrammatically, arrangements suitable for carrying out my invention.

Two methods of piloting ships through channels by instrumental reception of signals are at present in use; the submarine signal method, by sound waves transmitted through the water, and applicant's wireless pelorus (German Patent 225,256, Jan. 14, 1907). A third method, that of Stevenson and Owens, in which the ship is piloted through the channel by means of inductively received electric impulses from a cable laid along the channel has not yet come into general use on account of disturbing effects due to eddy currents generated in the water in the channel by the alternating or interrupted currents flowing in the cable, and by leakage currents.

Applicant has discovered, by means of a mathematical investigation, that this difficulty arises from the fact that, owing to the eddy currents, the lines of magnetic induction from the cable have the same direction i. e. inclination to the surface of the sea, at a plurality of points on both sides of the cable, thus making it impossible to determine on which side of the cable the ship is, with the apparatus heretofore used and described.

Applicant has discovered, by further mathematical investigation, later confirmed by experiment, that this difficulty is overcome by the use of the apparatus and methods herein described, in which a balancing coil, mounted on a vertical axis, is used to balance the indication or indications produced by another coil or coils, by rotation of said coil about said vertical axis, and the side of the cable on which the ship lies is determined by the direction of rotation about said axis necessary to balance. The subject has been discussed by Heavyside, Electromagnetic Theory, vol. 2, Appendix H, and by others, but so far as is known no solution has hitherto been given. The solution is not suitable for inclusion in a patent specification and will be published as a separate scientific paper, but full and complete instructions enabling any one skilled in the art to construct and use the apparatus and method of the invention are given in the present specification.

In the figure, 11 is the ship, 12 is the bottom of the channel, 13 is the cable, 14 the water line, 15, 16, 17, are coils of copper wire adapted to be inductively acted upon, and have electric currents generated in them by an alternating current flowing in the cable 13, when in its proximity; and connected as shown. The coils 15, 16, are preferably rigidly connected to the ship as shown, with the planes of the coils in the fore and aft direction and perpendicular to the water line. The coil 17 is rotatable about the vertical axis 18, and its plane normally lies in the plane of a cross-section of the ship, as shown, and at right angles to the plane of the coils 15, 16, and the axis 18 located amidships.

In operation the switch 20 is first thrown down and the currents induced in the coil 17 by the cable 13 flow through the conductor 19 to the conductor 28, thence through the tuning condenser 26 to the conductor 21, thence through the amplifier 22 back to the coil by the conductor 23. The telephone receiver 24 is connected to the amplifier 22, and by listening therein and turning the coil 17 till the sound is the loudest or weakest, according as the plane of the coil is parallel or perpendicular to the cable 13, the plane perpendicular to the cable is determined.

There remains to be determined which side of the cable the ship is on. In the absence of a plurality of points around the cable where the lines of force have the same direction this could readily be determined by measuring on which of the coils 15 or 16 the signals were received loudest, or by determining the slope of the lines of magnetic induction by mounting one of the coils, say 15 or 17, so that it is rotatable about a horizontal axis, and rotating it till the sound became a maximum or minimum. But owing to the existence of the plurality of similar points above referred to this method is misleading or indeterminate, especially near the cable and the ship might be steered against the side of the channel under the impression that it was being steered into the centre of the channel. It is therefore determined in the following way.

The coils 15, 16, are so connected as to oppose each other when the switch 20 is thrown up, and to be in series with the coil 17. The coils 15, 16, 17, are all tuned by the condenser 25. 27 is the conductor leading from the coil 16 to the switch 20.

When the coil 17 is turned so that its plane is perpendicular to the cable 13, then there will be a sound in the telephone receiver, as the coil 15 will, as shown, be nearer the cable 13 than the coil 16, and will consequently be more strongly acted upon. By now turning the coil 17 about its vertical axis a point will be found at which the sound is a minimum, and the direction in which the coil 17 must be turned to give this minimum will show on which side of the cable the ship is. Which direction corresponds to which side may be determined mathematically but is best ascertained by experiment, and the direction is then marked on the coil.

It might be thought that this could be determined by rotating the coil 17 about a horizontal axis; or, since if this were tried it would be found to fail, that there would be no use in rotating it about a vertical axis, but I have discovered that the rotation about the vertical axis does work and is reliable.

While the invention is herein described in connection with a certain type of position finding, I do not limit myself thereto, as those skilled in the art will readily apply it to other uses.

What I claim is:—

1. In a means for determining the position of a piloted vehicle with respect to a guiding cable carrying a periodically varying current producing a correspondingly varying magnetic field, two similar coils mounted on opposite sides of the longitudinal axis of said vehicle and a circuit including said coils, said coils being so wound and connected as to produce opposing currents on each variation in the current in said cable and differing in amplitude according to the position of the vehicle with respect to the cable, means for producing a neutralizing current in either direction in said circuit including indicating means movable from a central neutral position in opposite directions to show the position of the cable and electroresponsive indicating means for determining the neutral condition of said circuit.

2. The method of determining the location of a current carrying cable with respect to a piloted vehicle which consists in generating at two spaced points on said vehicle currents which are in phase but opposite in direction and which preponderate in potential according as to which point is nearer to the cable, causing said currents to oppose each other in a common circuit, introducing into said circuit a potential variable in direction and amount, varying the potential so as to neutralize the preponderating effect of one coil over the other to reduce the current in the circuit to zero and producing an indication corresponding in direction and amount to the amount of change in potential required to reduce the current to zero to give a corresponding indication as to the relative position of the vehicle and cable.

REGINALD A. FESSENDEN.